(12) United States Patent
Vasudeva et al.

(10) Patent No.: US 11,511,852 B2
(45) Date of Patent: Nov. 29, 2022

(54) MECHANICALLY OPERATED LANDING GEAR UPLOCK SYSTEMS AND METHODS

(71) Applicant: GOODRICH CORPORATION, Charlotte, NC (US)

(72) Inventors: Vishwanath Vasudeva, Bengaluru (IN); Sagar Kulkarni, Bengaluru (IN); Bharath Marappan, Bangalore (IN); Adnan Cepic, Mississauga (CA)

(73) Assignee: Goodrich Corporation, Charlotte, NC (US)

( * ) Notice: Subject to any disclaimer, the term of this patent is extended or adjusted under 35 U.S.C. 154(b) by 99 days.

(21) Appl. No.: 17/132,113

(22) Filed: Dec. 23, 2020

(65) Prior Publication Data
US 2022/0024565 A1     Jan. 27, 2022

(30) Foreign Application Priority Data
Jul. 27, 2020   (IN) .............................. 202041032124

(51) Int. Cl.
   *B64C 25/26*       (2006.01)
(52) U.S. Cl.
   CPC .................................. *B64C 25/26* (2013.01)
(58) Field of Classification Search
   CPC ........... B64C 25/26; B64C 25/20; B64C 3/56; Y10T 292/0911; Y10T 292/0926; Y10T 292/093; Y10T 292/1043; Y10T 292/1051; Y10T 292/1056; E05C 3/06; F03G 7/06
   See application file for complete search history.

(56) References Cited

U.S. PATENT DOCUMENTS

| | | | | |
|---|---|---|---|---|
| 2,423,501 | A | * | 7/1947 | Johnson .................. B64C 25/26 244/102 SL |
| 3,504,406 | A | * | 4/1970 | Schott ..................... E05B 65/00 294/82.26 |
| 5,288,037 | A | * | 2/1994 | Derrien ............... E05B 47/0607 294/82.3 |
| 6,168,113 | B1 | | 1/2001 | Hann |
| 7,883,125 | B2 | * | 2/2011 | Smith, III ................ E05C 3/24 292/201 |
| 10,124,884 | B2 | | 11/2018 | Walke et al. |
| 2005/0194792 | A1 | * | 9/2005 | Lomicka ............. E05B 15/0053 292/96 |
| 2017/0101172 | A1 | * | 4/2017 | Walke ..................... B64C 25/26 |
| 2019/0233092 | A1 | | 8/2019 | Walke et al. |
| 2020/0377224 | A1 | * | 12/2020 | Brighton ............ B64D 45/0005 |

FOREIGN PATENT DOCUMENTS

| | | |
|---|---|---|
| CN | 108945400 | 12/2018 |
| WO | 2018189299 | 10/2018 |

OTHER PUBLICATIONS

European Patent Office, European Search Report dated Jan. 4, 2022 in Application No. 21187201.5.

* cited by examiner

*Primary Examiner* — Medhat Badawi
*Assistant Examiner* — Vicente Rodriguez
(74) *Attorney, Agent, or Firm* — Snell & Wilmer L.L.P.

(57) ABSTRACT

An uplock system includes a cam plate comprising a cam channel, a hook configured to rotate with respect to the cam plate, a follower rotatably coupled to the hook, wherein a portion of the follower moves within the cam channel in response to rotation of the hook, a stopper configured to engage the follower, and a first biasing member configured to bias the stopper towards the follower to stop the follower from moving within the cam channel, thereby locking the hook in a locked position.

19 Claims, 19 Drawing Sheets

MECHANICALLY OPERATED LANDING GEAR UPLOCK SYSTEMS AND METHODS

CROSS-REFERENCE TO RELATED APPLICATIONS

This application is a non-provisional of, and claims priority to, and the benefit of India Provisional Application No., 202041032124 with DAS code C3F8, entitled "MECHANICALLY OPERATED LANDING GEAR UPLOCK SYSTEMS AND METHODS," filed on Jul. 27, 2020, which is hereby incorporated by reference in its entirety.

FIELD

The present disclosure relates to aircraft landing gear, and, more specifically, to a system and method for locking landing gear in a stowed position.

BACKGROUND

Aircraft uplock mechanisms are designed to lock landing gear in a stowed position and assist in carrying the weight of the landing gear during flight. Conventional uplock mechanisms comprise spring loaded catch systems and hydraulic systems to release the locking mechanism. Hydraulic actuation systems can be complex in functionality and design.

SUMMARY

An uplock system is disclosed, comprising a cam plate comprising a cam channel, a hook having an opening, the hook configured to rotate with respect to the cam plate, a stopper configured to rotate with respect to the cam plate, a first biasing member configured to bias the stopper in a first rotational direction relative to the cam plate, and a follower rotatably coupled to the hook, wherein a portion of the follower moves within the cam channel, wherein the first biasing member is configured to bias the stopper in the first rotational direction to stop the portion of the follower from moving along the channel and secure the hook in a locked position.

In various embodiments, the portion of the follower is configured to push against the stopper to rotate the stopper in a second rotational direction, against the bias of the first biasing member, in response to the hook rotating with respect to the cam plate.

In various embodiments, the portion of the follower is configured to push against the stopper to rotate the stopper in the second rotational direction, against the bias of the first biasing member, in response to the hook rotating in the second rotational direction with respect to the cam plate, to an unlocked position.

In various embodiments, the uplock system further comprises a second biasing member configured to bias the hook in a second rotational direction.

In various embodiments, the uplock system further comprises a third biasing member configured to bias the follower towards the stopper.

In various embodiments, the portion of the follower comprises a roller.

In various embodiments, the follower is coupled to the hook at a location opposite the hook from the opening.

In various embodiments, the uplock system further comprises a non-return stopper rotatably coupled to the cam plate, the non-return stopper configured to rotate with respect to the cam plate in response to contacting the follower.

In various embodiments, the uplock system further comprises a fourth biasing member operably coupled to the non-return stopper.

In various embodiments, the first biasing member comprises a compression spring.

In various embodiments, the second biasing member comprises a tension spring.

In various embodiments, the third biasing member comprises a leaf spring.

In various embodiments, the uplock system further comprises a cam feature, wherein the cam channel surrounds the cam feature.

In various embodiments, in the locked position, the roller is in contact with the stopper, the cam feature, and a third biasing member.

In various embodiments, the uplock system further comprises a manual release system, the manual release system including a cable coupled to the hook, wherein the cable is configured to rotate the hook in the second rotational direction to begin an unlocking process. The manual release system may be configured to return to an initial position in response to tension on the cable being released.

An uplock system is disclosed, comprising a cam plate comprising a cam channel, a hook configured to rotate with respect to the cam plate, a follower rotatably coupled to the hook, wherein a portion of the follower moves within the cam channel in response to rotation of the hook, a stopper configured to engage the follower, and a first biasing member configured to bias the stopper towards the follower to stop the follower from moving within the cam channel, thereby locking the hook in a locked position.

In various embodiments, the stopper is pivotally coupled to the cam plate.

In various embodiments, the uplock system further comprises a non-return stopper rotatably coupled to the cam plate, and a torsion spring configured to bias the non-return stopper in a first rotational direction, wherein the non-return stopper is configured to rotate in response to the follower contacting the non-return stopper.

In various embodiments, the hook comprises a hook opening, the hook opening configured to receive a landing gear roller.

A method of operating an uplock system is disclosed, comprising rotating a landing gear towards a deployed position, wherein the landing gear comprises a latchable member, contacting, by the latchable member, a hook, wherein the hook is configured to rotate with respect to a cam plate, rotating the hook in a second rotational direction in response to the contacting, moving a follower along a cam channel in response to the rotating of the hook, wherein the cam channel is disposed in the cam plate and the follower is rotatably coupled to the hook, contacting, by the follower, a stopper, wherein a load is transmitted from the follower into a first biasing member in response to the follower contacting the stopper, and moving, by the stopper, away from the follower, in response to the load overcoming a spring force of the first biasing member.

In various embodiments, the hook is configured to release the latchable member in response to the hook rotating in the second rotational direction.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

In various embodiments, a landing gear uplock system may be a passive system. A passive landing gear uplock system may provide a lightweight and simple system which may decrease overall part count and/or decrease overall weight of a landing gear assembly.

Figure 1A:
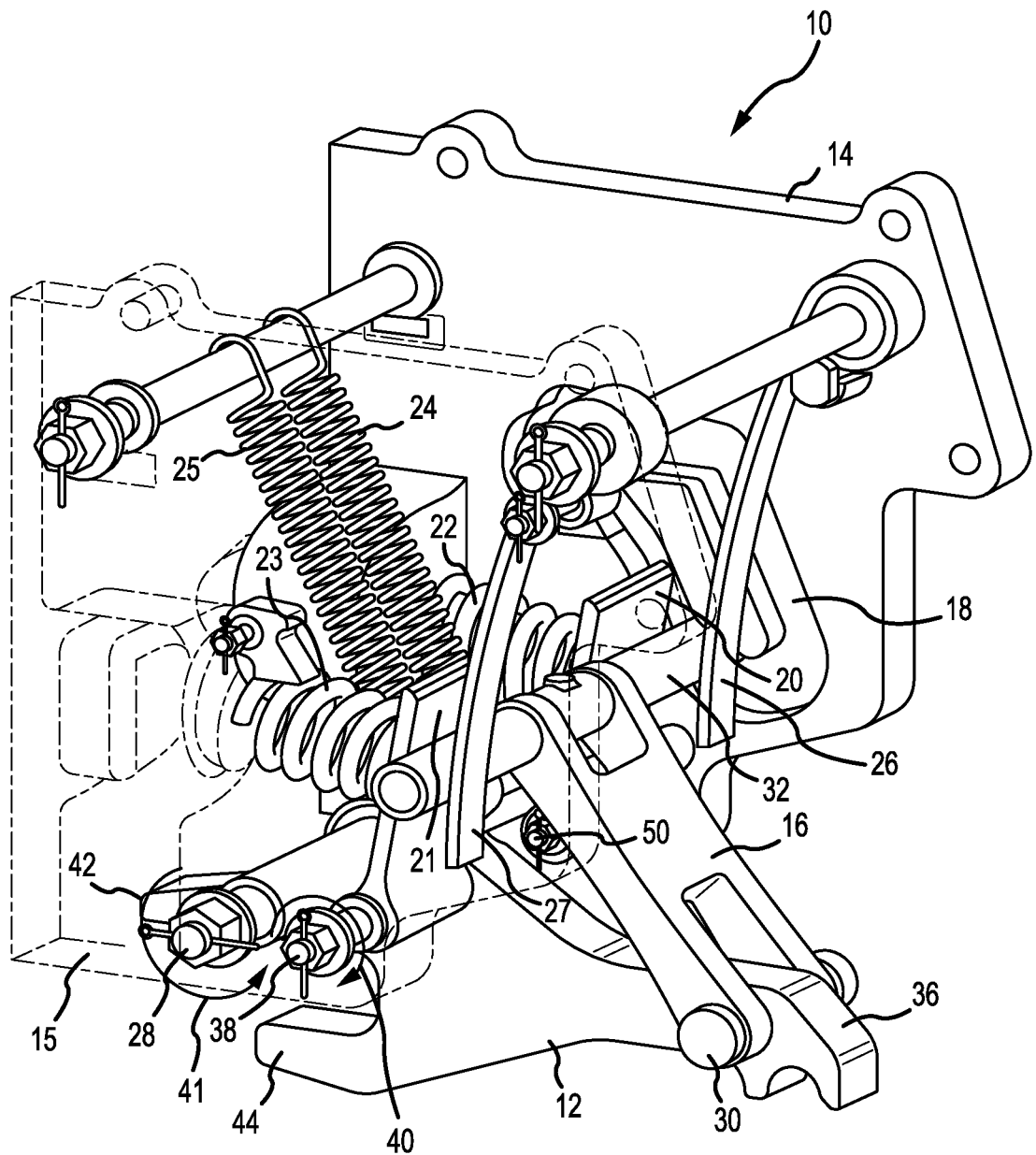
FIG. 1A illustrates a perspective view of a landing gear uplock system with a second cam plate illustrated transparent for clarity purposes, in accordance with various embodiments.
Figure 1B:
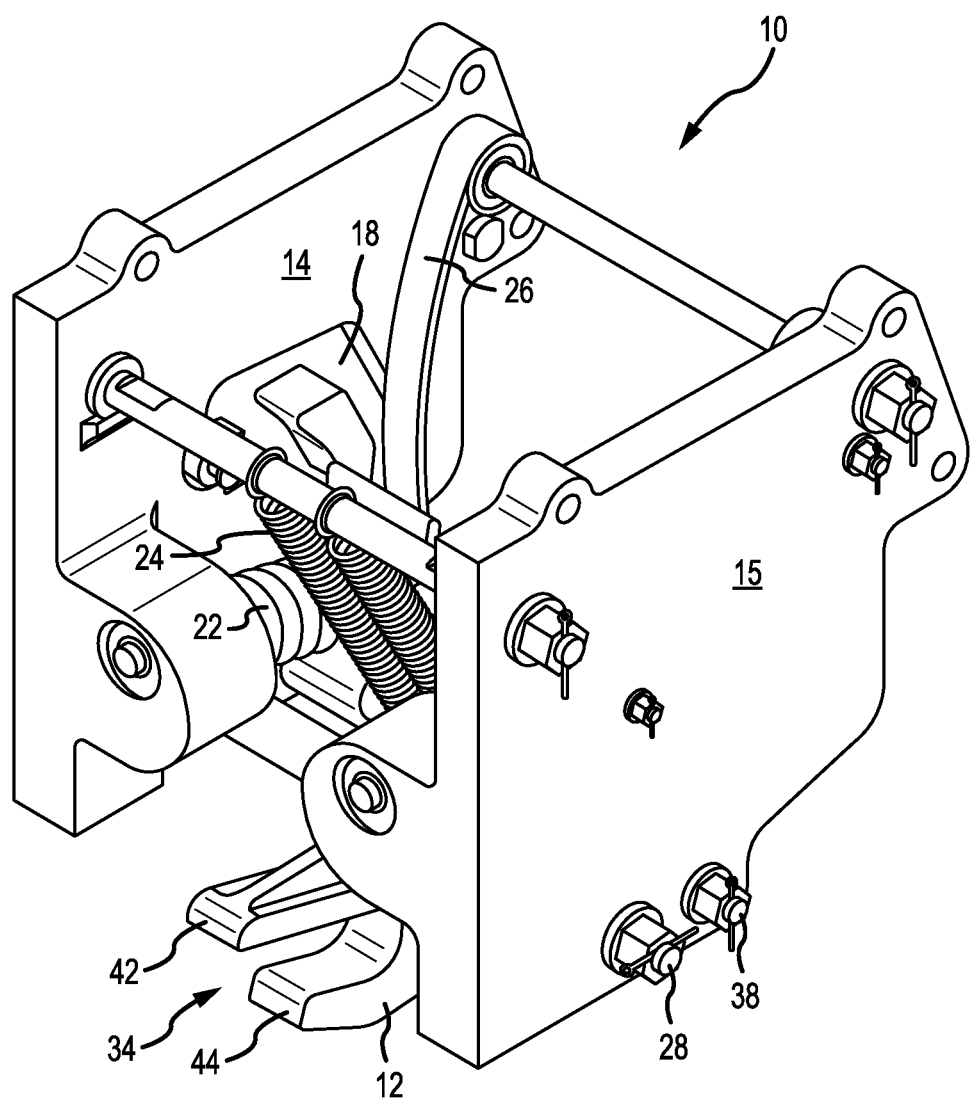
FIG. 1B illustrates an alternative perspective view of the landing gear uplock system of FIG. 1A, in accordance with various embodiments.

A landing gear uplock system may comprise a hook member supported between a first cam plate and a second cam plate, wherein the landing gear uplock system is substantially mirrored about the hook member according to various embodiments and as illustrated in FIG. 1A and FIG. 1B. Although in various portions of the present specification the landing gear uplock system may be described relative to only one side of the landing gear uplock system (i.e., with respect to only one of the cam plates), the landing gear uplock system may comprise an equal and opposite side which includes the same features as the side described, as shown herein. For example, in various portions of the present specification, although the landing gear uplock system is illustrated herein as having a single cam plate, there may be a second cam plate on the opposite side of the hook member which is also operatively coupled to the hook and which may operate in a similar manner as the first cam plate.

Figure 1C:
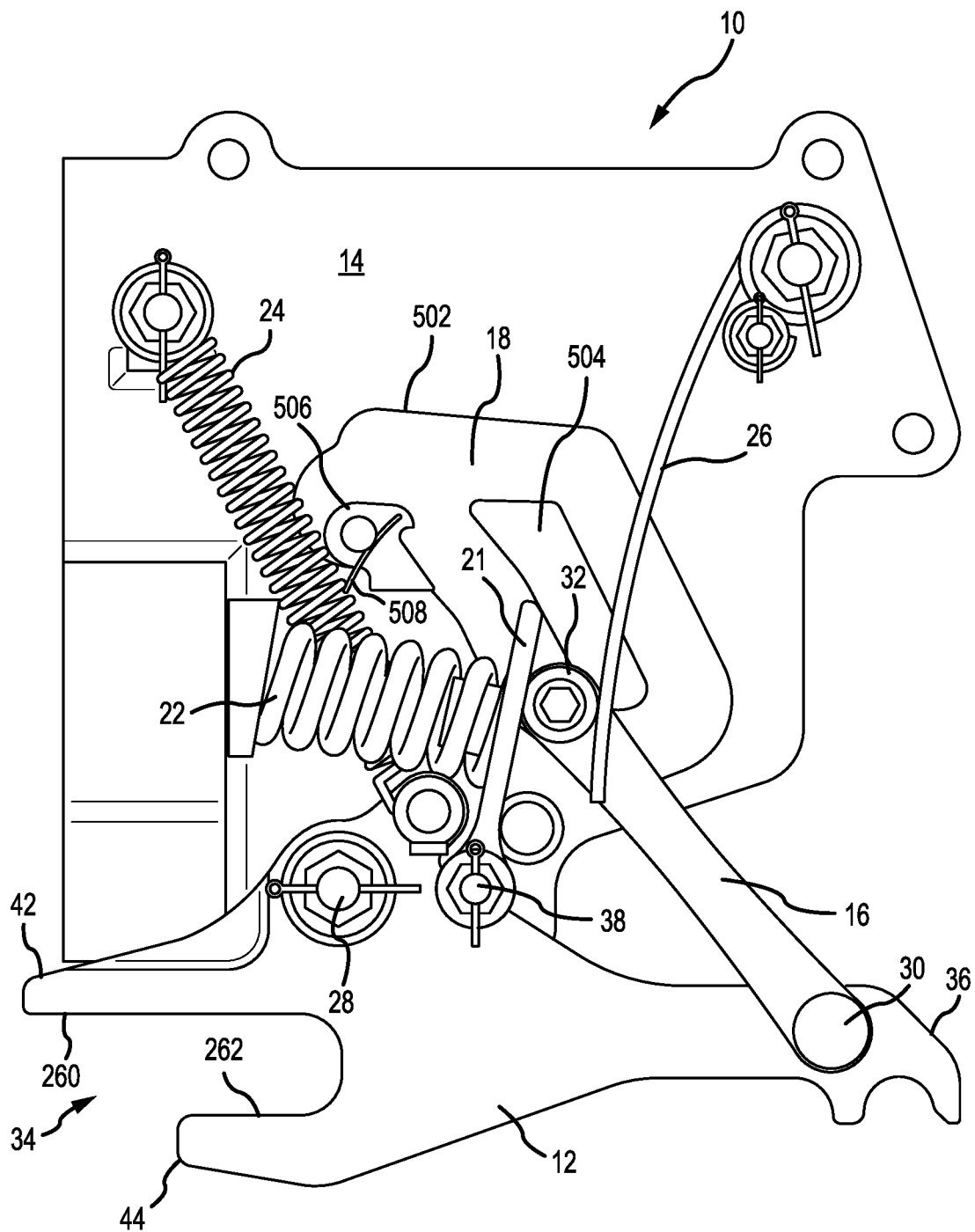
FIG. 1C illustrates a section view of the landing gear uplock system of FIG. 1A, in accordance with various embodiments.

With combined reference to FIG. 1A, FIG. 1B, and FIG. 1C, an uplock system 10 (also referred to herein as a powerless, self-operated uplock system 10) is illustrated. In various embodiments, uplock system 10 may be used in the landing gear of an aircraft. Uplock system 10 may generally include a hook 12, a cam plate 14 (also referred to herein as a first cam plate), a cam plate 15 (also referred to herein as a second cam plate), a following member 16 (also referred to herein as follower), a cam channel 18, a stopper 20 (also referred to herein as a flap stopper), a first biasing member 22 (also referred to herein as first spring), a second biasing member 24 (also referred to herein as second spring), and a third biasing member 26 (also referred to herein as third spring). As previously mentioned, uplock system 10 may include two of each of the aforementioned members in mirrored position with respect to each other, except that uplock system 10 may only comprise one hook 12, in accordance with various embodiments. In this regard, uplock system 10 may further comprise biasing member 23 (also referred to herein as a first biasing member), biasing member 25 (also referred to herein as a second biasing member), biasing member 27 (also referred to herein as a third biasing member), and stopper 21 (also referred to herein as a flap stopper). In various embodiments, first biasing member 22 comprises a coil spring and/or compression spring. However, first biasing member 22 may comprise a coil spring, elastic band, leaf spring, Belleville washer, or any other forms of a spring. In various embodiments, second biasing member 24 comprises a coil spring and/or tension spring. However, second biasing member 24 may comprise a coil spring, elastic band, leaf spring, Belleville washer, or any other forms of a spring. In various embodiments, third biasing member 26 comprises a leaf spring. However, third biasing member 26 may comprise a coil spring, elastic band, leaf spring, Belleville washer, tension spring, compression spring, or any other forms of a spring.

In various embodiments, the hook 12 may comprise a first prong 42, a second prong 44, and hook arm 36. In various embodiments, first prong 42 and second prong 44 may define a hook opening 34 located between first prong 42 and second prong 44. Hook arm 36 may extend away from hook opening 34. In various embodiments, hook 12 may comprise a fork structure as shown by first prong 42 and second prong 44, in accordance with various embodiments.

Hook 12 may be coupled to first cam plate 14 and second cam plate 15 via pin 28 (also referred to herein as a first pivot and/or a hook pin). Hook 12 may be configured to pivot about pin 28. Thus, hook 12 may be rotationally engaged with first cam plate 14 and second cam plate 15 via pin 28. Follower 16 may be coupled to hook arm 36 via a pin 30 (also referred to herein as a second pivot or a follower pin). Follower 16 may be configured to pivot about pin 30. Follower 16 may include roller 32. Roller 32 may be located on the opposite side of follower 16 from pin 30.

Stopper 20 may be pivotally coupled to cam plate 14 via a pin 50. Uplock system 10 may comprise a second stopper 21. Second stopper 21 may be similar to stopper 20. Second stopper 21 may be disposed opposite hook 12 from stopper 20, in a mirrored configuration. Stopper 21 may be pivotally coupled to cam plate 15 via a pin 38. First biasing member 22 may be coupled between cam plate 14 and stopper 20. The first biasing member 22 may bias the stopper 20 to rotate about its associated pin 50 in the clockwise direction as viewed in FIG. 1A through FIG. 1C, for example, as illustrated by arrow 40. The second biasing member 24 may bias hook 12 to rotate about the first pin 28 in the counter-clockwise direction as viewed in FIG. 1A through FIG. 1C, for example, as illustrated by arrow 41.

With reference to FIG. 1C through FIG. 2B and FIG. 5A through FIG. 6B, cam plate 15 is omitted for clarity purposes.

Figure 2A:
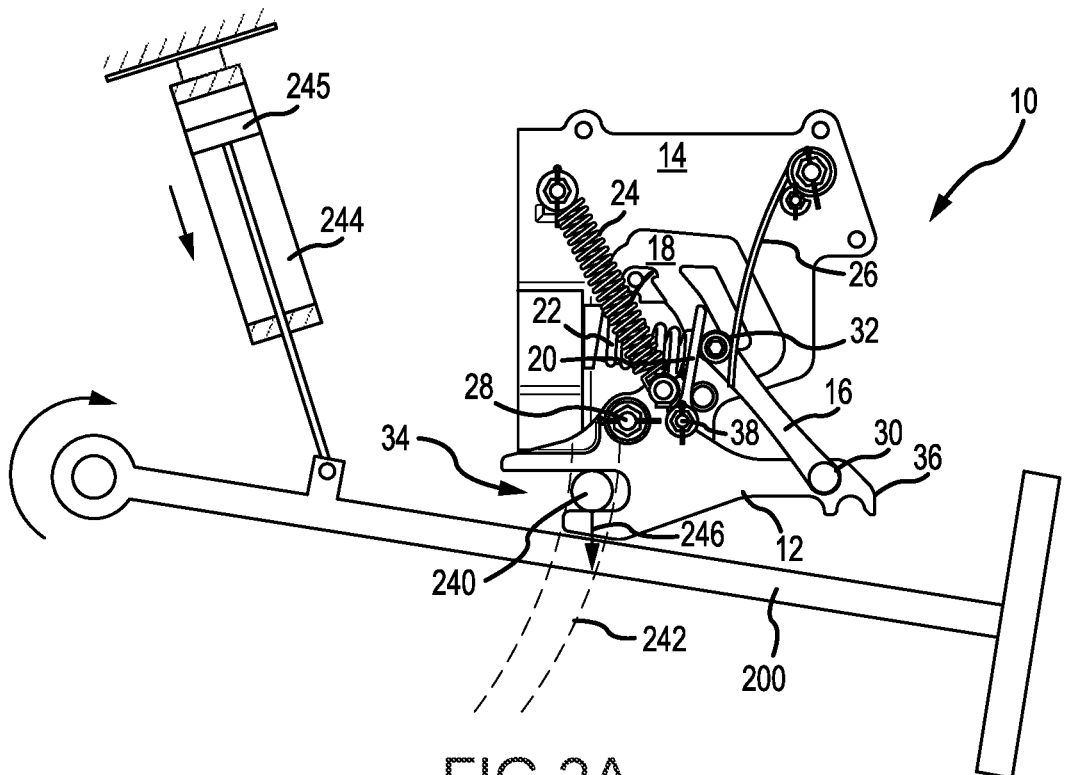
FIG. 2A illustrates a schematic view of a landing gear uplock system securing a landing gear in a stowed and locked position, in accordance with various embodiments.
Figure 2B:
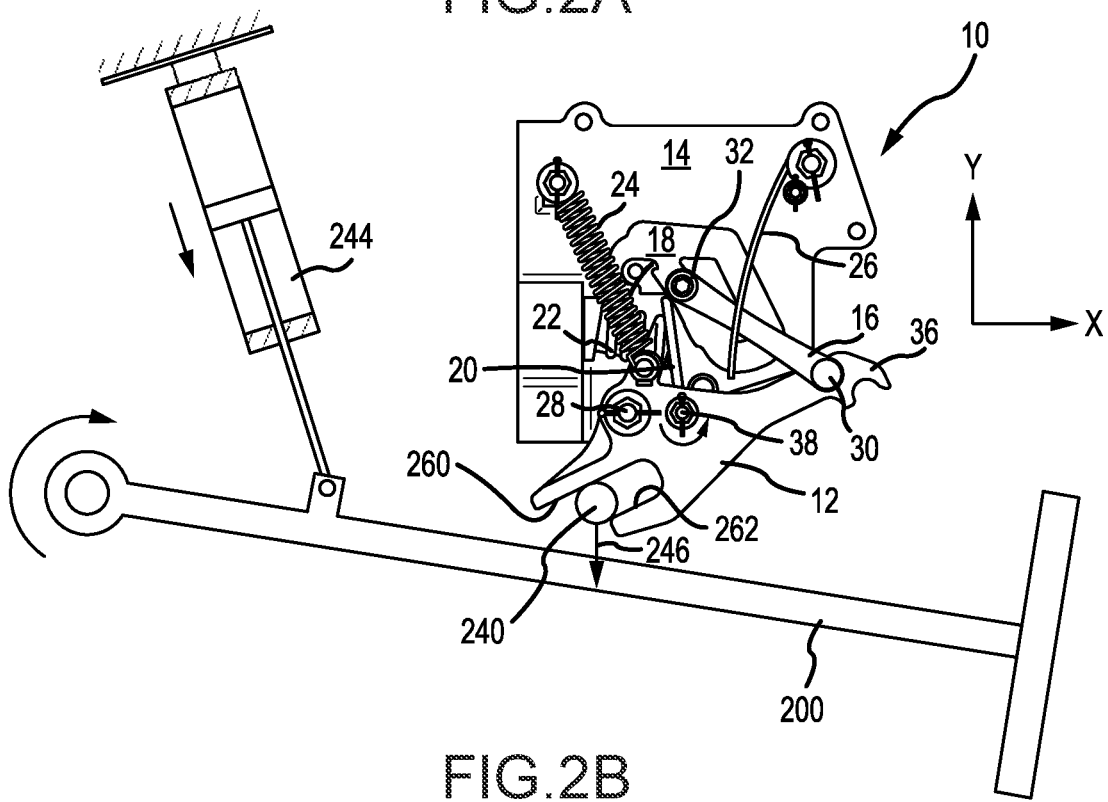
FIG. 2B illustrates a schematic view of the landing gear uplock system of FIG. 2A moving towards a deployed position, in accordance with various embodiments.

With reference to FIG. 2A, a schematic view of uplock system 10 securing a landing gear in a stowed and locked position is illustrated, in accordance with various embodiments. In various embodiments, hook opening 34 may be configured to receive a latchable member (also referred to herein as a landing gear roller) 240. Landing gear roller 240 may be released from hook opening 34 in response to landing gear 200 moving to a deployed position as illustrated in FIG. 2B. Landing gear roller 240 may be coupled to aircraft landing gear 200. Landing gear roller 240 may be configured to engage hook 12 to lock landing gear roller 240 in a stowed position. Biasing member 22 may stop follower 16 from moving along cam channel 18, thereby preventing rotation of hook member 12 and securing hook 12 in a locked position. The urging of biasing member 22 may be overcome in response to actuation of landing gear actuator 244. For example, extension of landing gear actuator 244 may transmit a load through hook 12, follower 16, stopper 20, and into biasing member 22, thereby compressing biasing member 22 and causing stopper 20 to rotate away from cam channel 18, which allows follower 16 to move clockwise in cam channel 18 as hook 12 rotates, and allows landing gear roller 240 to be released from hook opening 34. In various embodiments, landing gear roller 240 may be configured to move in the y-direction as illustrated by roller movement window 242. Roller movement window 242 illustrates the path by which landing gear roller 240 travels.

Figure 3:
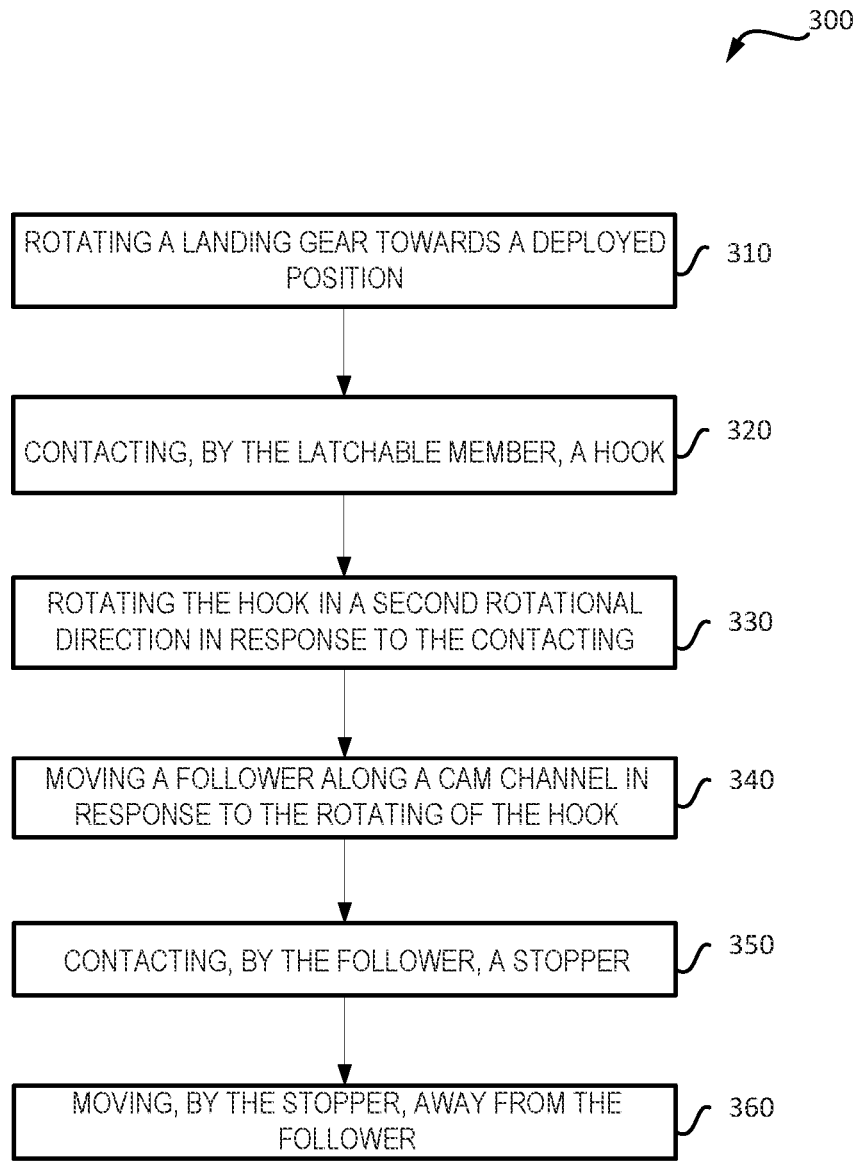
FIG. 3 illustrates a flow chart of a method for operating an uplock system, in accordance with various embodiments.

With reference to FIG. 3, a method 300 for operating an uplock system 10 is provided, in accordance with various embodiments.

With further reference to FIG. 2A and FIG. 2B, when a landing gear is moved from a stowed position to a deployed position, actuator 244 may be actuated to rotate landing gear 200 (see step 310 in FIG. 3). In response, landing gear roller 240 may move in the direction as illustrated by first arrow 246 (negative y-direction) and engage second surface 262 of hook 12 to begin the unlocking process of uplock system 10 (see step 320 in FIG. 3). The engagement may cause hook 12 to rotate about first pin 28 in a counter-clockwise direction as viewed in FIG. 2A, for example, (also referred to herein as a second rotational direction) (see step 330 in FIG. 3). The rotation of hook 12 about first pin 28 in the counter-clockwise direction may drive follower 16 generally in the positive y-direction causing roller 32 to engage or otherwise interact with stopper 20 (see step 350 of FIG. 3). The interaction of roller 32 and cam channel 18 may cause follower 16 to rotate about second pin 30. Furthermore, the rotation of hook 12 about pin 28 may cause follower 16 to push against stopper 20, thereby exerting a landing gear deployment force into biasing member 22. In response to the landing gear deployment force overcoming the spring force of biasing member 22, stopper 20 may move away from cam channel 18 to allow follower to move along cam channel 18. Stated differently, stopper 20 may move away from follower 16. In various embodiments, stopper 20 rotates with respect to cam plate 14 about pin 50 (see FIG. 1A) in the counter-clockwise direction as viewed in FIG. 2A in response to follower 16 pushing against stopper 20 (see FIG. 2B). In various embodiments, the bias of biasing member 22 is strong enough to prevent unwanted deployment of landing gear 200. For example, the spring force of biasing member 22 may be configured to withstand forces between hook 12 and landing gear roller 240 that are greater than two times the mass of landing gear 200 times the force of gravity at sea level (2$g$), and in various embodiments, the spring force of biasing member 22 may be configured to withstand forces between hook 12 and landing gear roller 240 that are greater than three times the mass of landing gear 200 times the force of gravity at sea level (3$g$), and in various embodiments, the spring force of biasing member 22 may be configured to withstand forces between hook 12 and landing gear roller 240 that are greater than four times the mass of landing gear 200 times the force of gravity at sea level (4$g$). In various embodiments, the spring force of biasing member 22 may be configured to withstand forces between hook 12 and landing gear roller 240 that are up to about four times the mass of landing gear 200 times the force of gravity at sea level (4$g$), wherein the term "about" in this context can only mean±20%. In this regard, extension of actuator 244 may exert a deployment force (see arrow 246) on hook 12 that is greater than about four times the mass of landing gear 200 times the force of gravity at sea level (4$g$) in accordance with various embodiments, is greater than three times the mass of landing gear 200 times the force of gravity at sea level (3$g$)

in accordance with various embodiments, and/or is greater than two times the mass of landing gear 200 times the force of gravity at sea level (2g) in accordance with various embodiments. However, the spring force of biasing member 22 may be tailored in accordance with various desired design parameters, such as landing gear weight, the mechanical advantage of hook 12, temperature, etc. In response to overcoming the bias of biasing member 22, stopper 20 may be rotated out of the way of follower 16 and follower 16 may move along cam channel 18 as hook 12 rotates about pin 28 (see step 340 and step 360 of FIG. 3). As hook 12 rotates in the counter-clockwise direction, the landing gear roller 240 may be released from hook 12 to allow the landing gear 200 to fully deploy.

Figure 4:
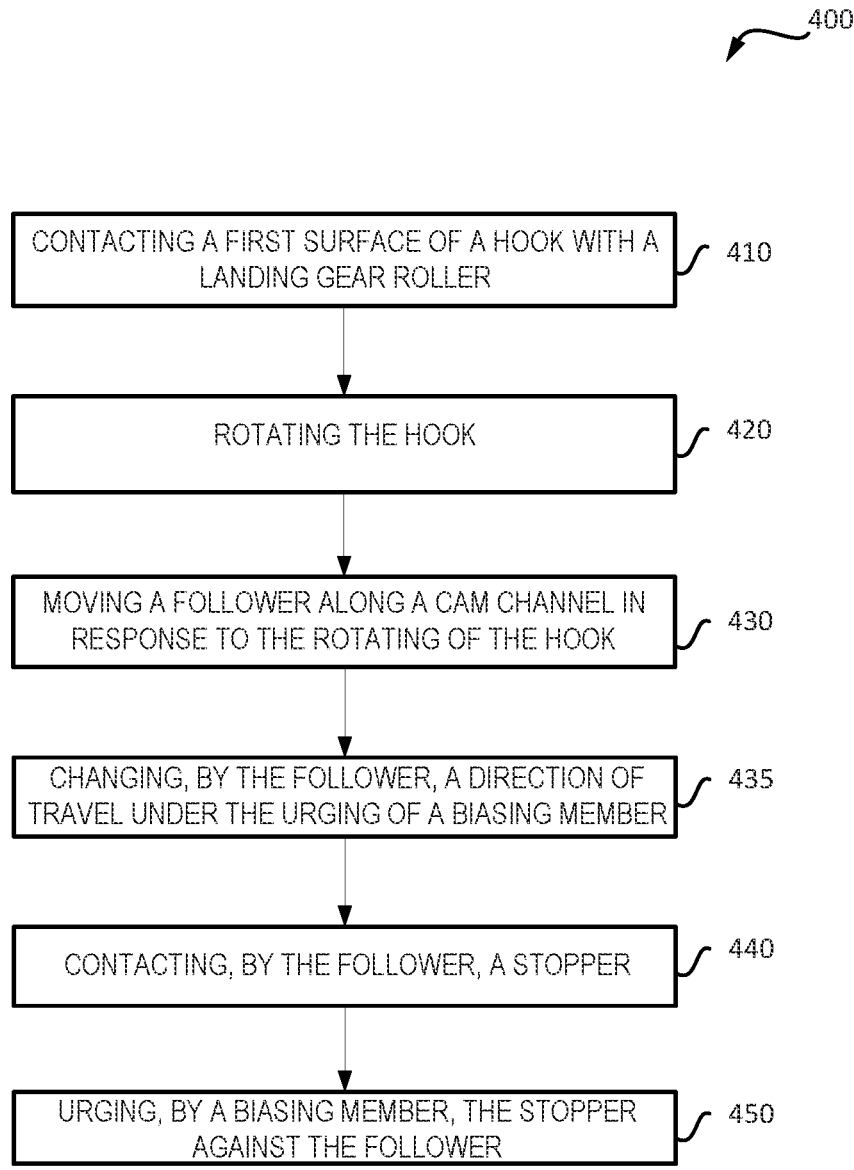
FIG. 4 illustrates a flow chart of a method for operating an uplock system, in accordance with various embodiments.

With reference to FIG. 4, a method 400 for operating an uplock system 10 is provided, in accordance with various embodiments.

Figure 5A:
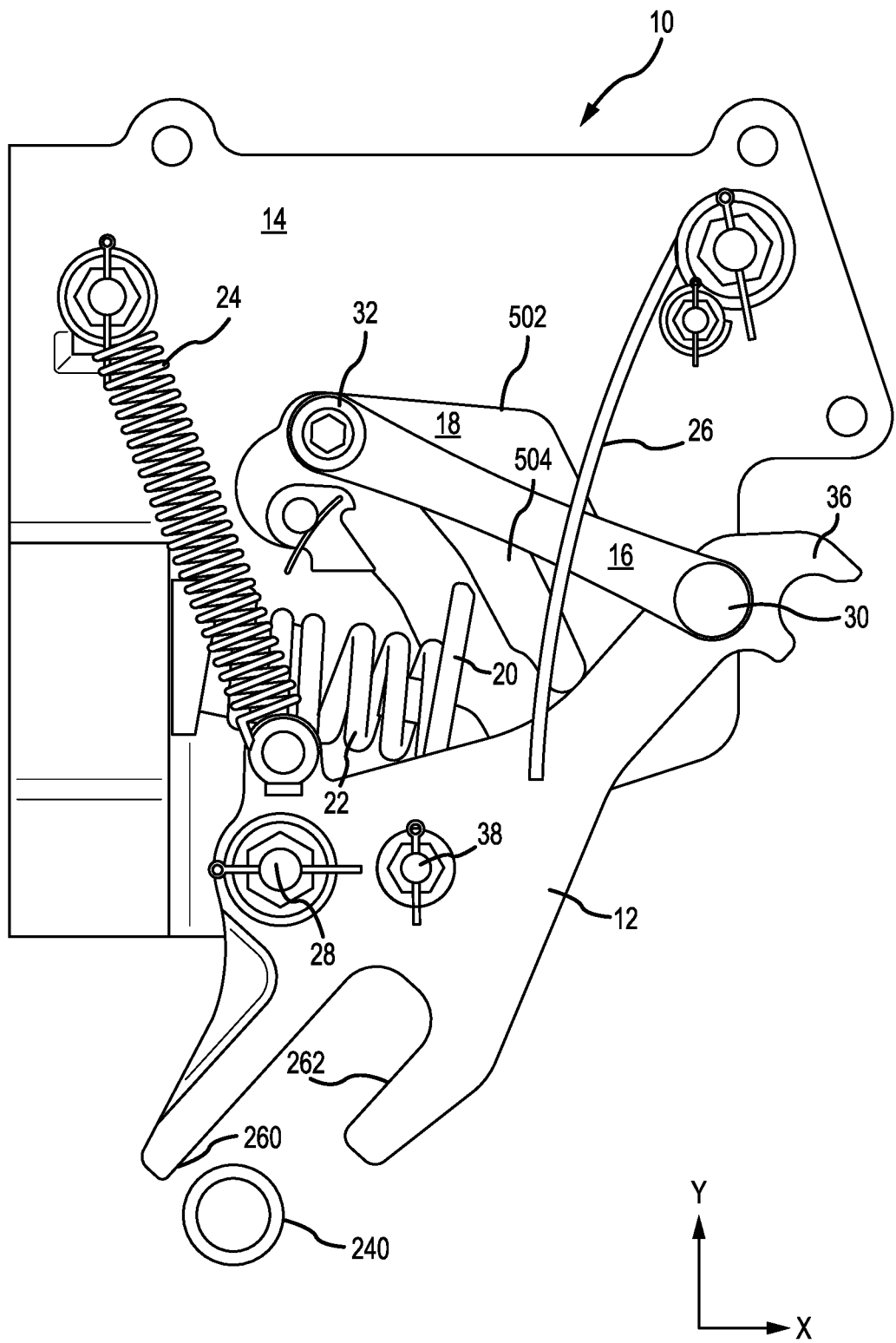
FIG. 5A illustrates a schematic view of a landing gear uplock system in an unlocked, initial position, in accordance with various embodiments.
Figure 5B:
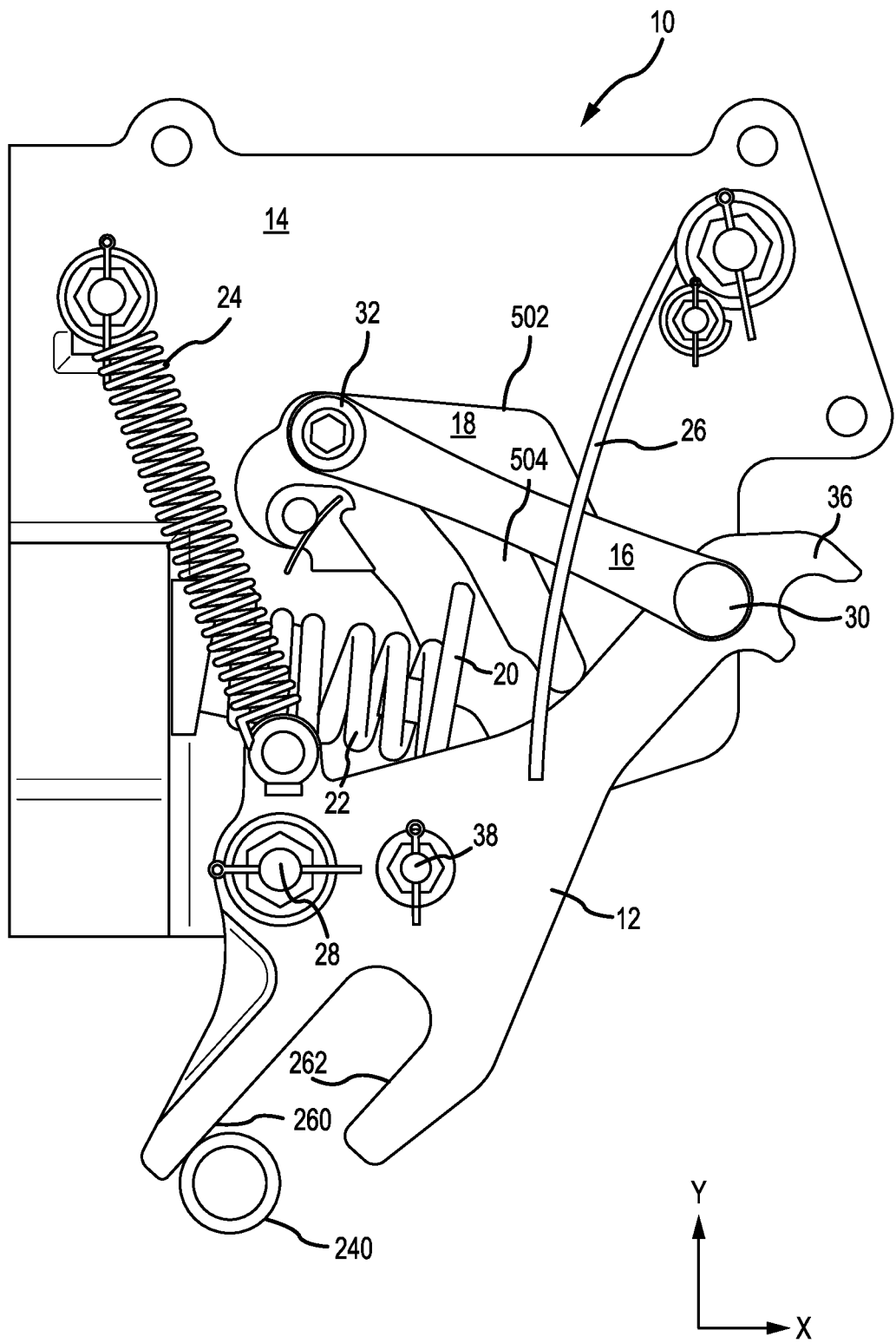
FIG. 5B illustrates a locking process of a landing gear uplock system, in accordance with various embodiments.
Figure 5C:
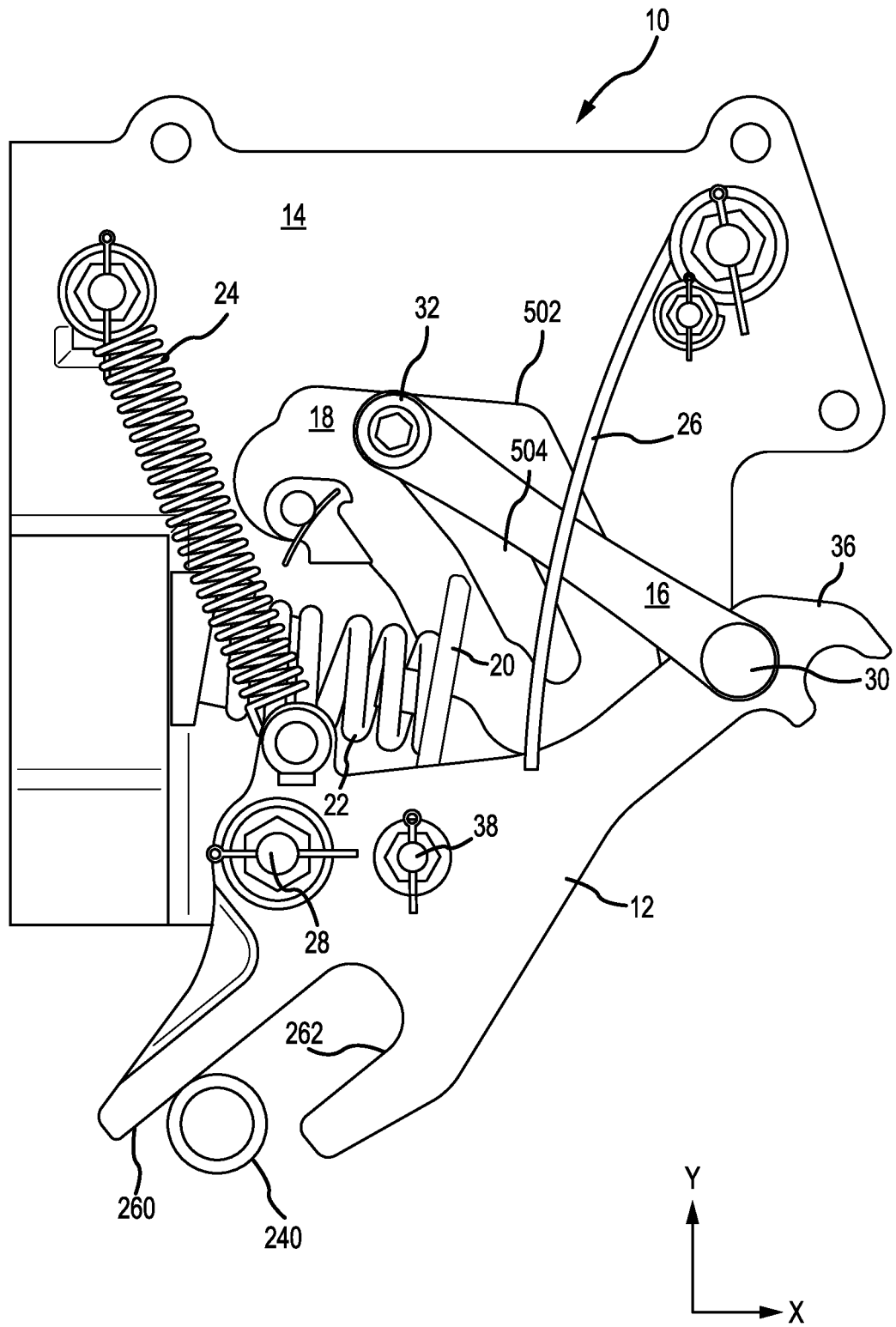
FIG. 5C illustrates a locking process of a landing gear uplock system, in accordance with various embodiments.
Figure 5D:
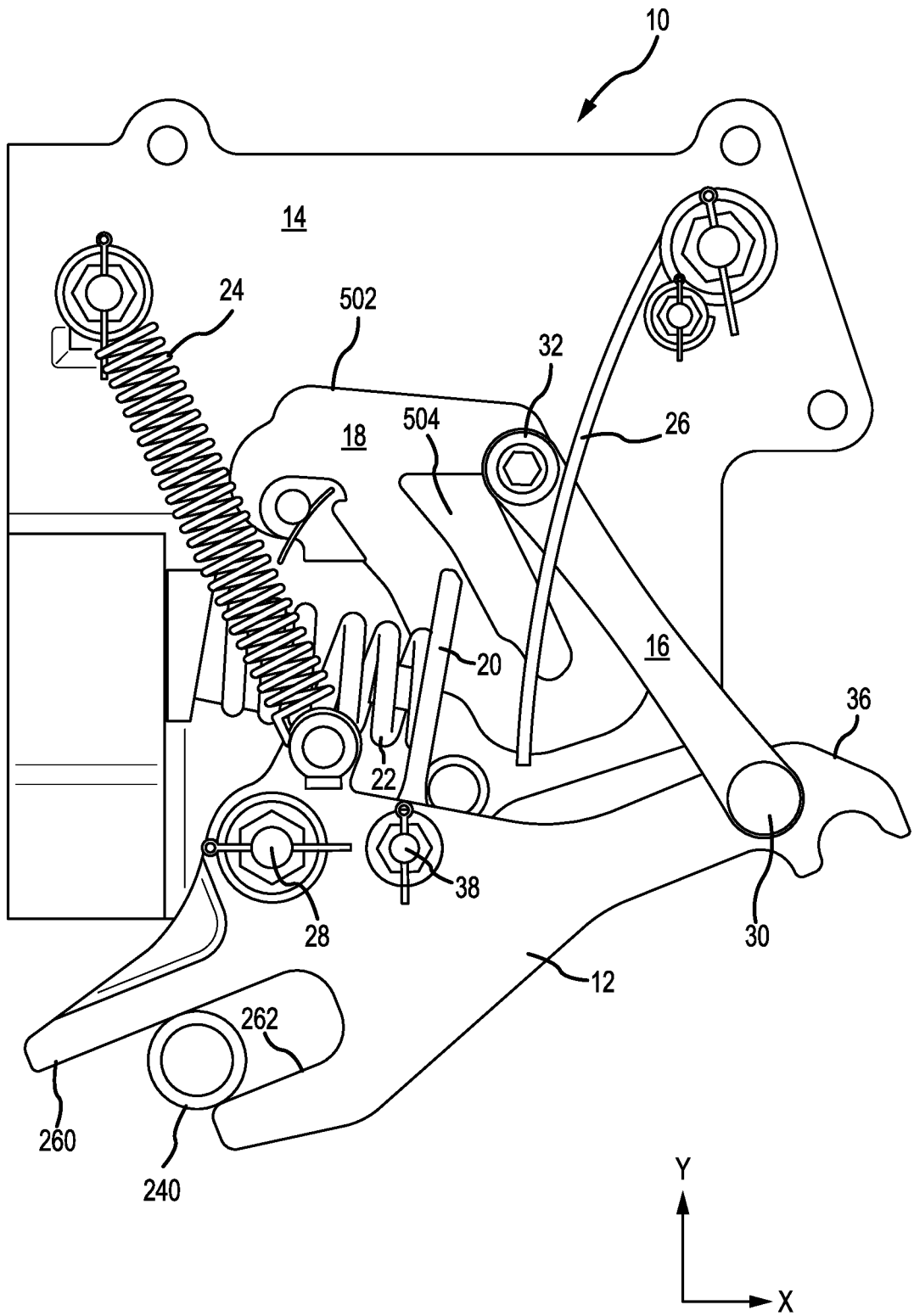
FIG. 5D illustrates a locking process of a landing gear uplock system, in accordance with various embodiments.
Figure 5E:
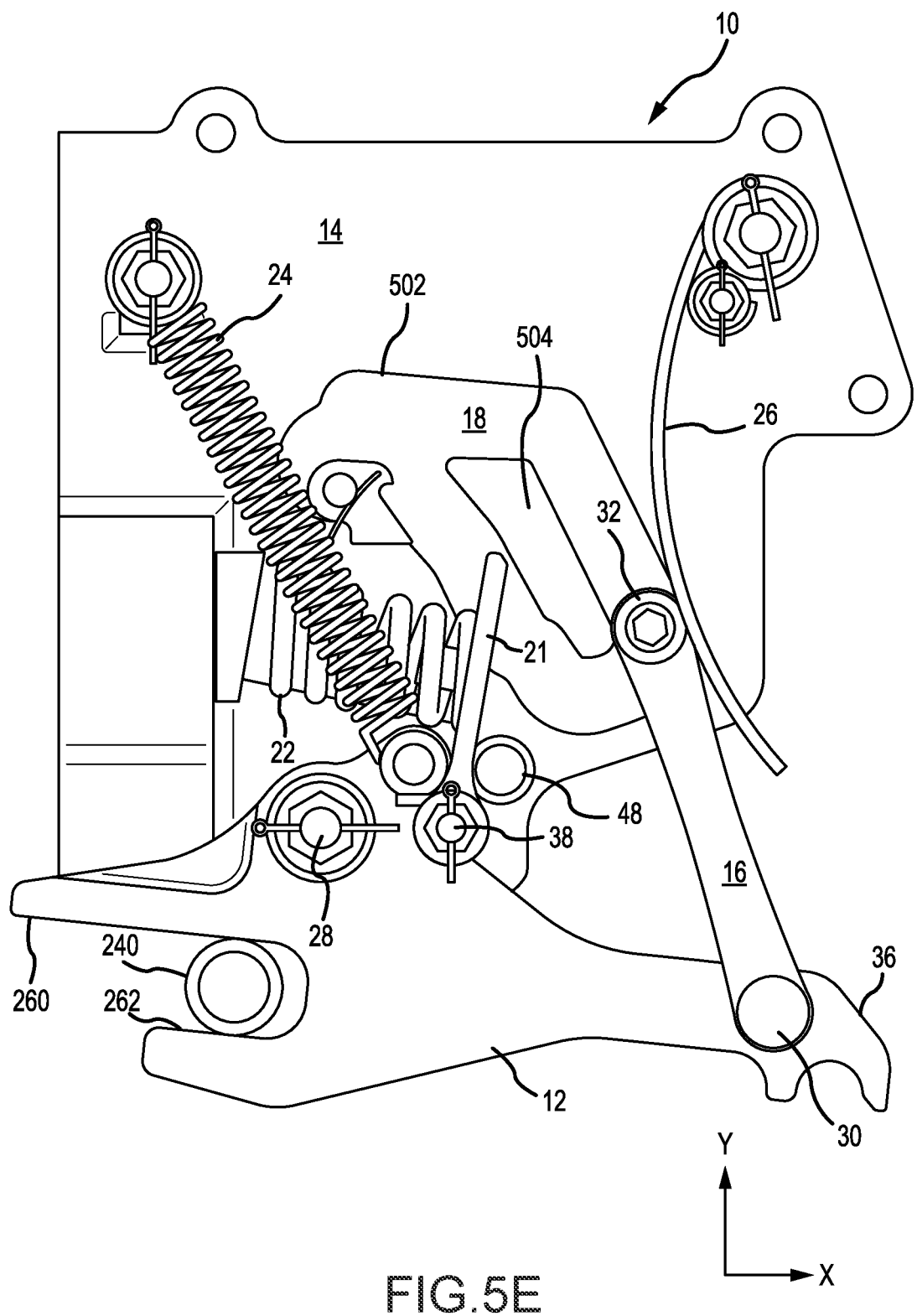
FIG. 5E illustrates a locking process of a landing gear uplock system, in accordance with various embodiments.

With further reference to FIG. 5A, uplock system 10 is illustrated in an unlocked position, with hook 12 in a receiving position, configured to receive landing gear roller 240. With momentary reference to FIG. 5B, in response to a landing gear being retracted from a deployed position to a stowed position, landing gear roller 240 may move generally in the positive y-direction and engage first surface 260 of hook 12 to begin the locking process of uplock system 10 (see step 410 in FIG. 4). The engagement may cause hook 12 to rotate about first pin 28 in a clockwise direction as viewed in FIG. 5A, for example, (also referred to herein as a first rotational direction) (see step 420 in FIG. 4). The rotation of hook 12 about first pin 28 in the clockwise direction may drive follower 16 in the positive x-direction and negative y-direction causing roller 32 to engage or otherwise interact with the surface 502 of cam plate 14 that defines cam channel 18 (see step 430 in FIG. 4). Thus, hook 12 may be moved out of its unlocked or first stable position as illustrated in FIG. 5A. As the hook 12 rotates about pin 28, the hook 12 may rotate against the bias of biasing member 24, generating a preload in biasing member 24. With momentary reference to FIG. 5D, the interaction of roller 32 and cam channel 18 may cause follower 16 to rotate about second pin 30. With additional reference to FIG. 5E, as roller 32 moves along cam channel 18, roller 32 may contact biasing member 26 which may cause follower 16 to preload biasing member 26. Biasing member 26 may bias roller 32 against cam feature 504. Cam feature 504 may comprise a boss feature extending from cam plate 14 and partially defining cam channel 18. In various embodiments, cam channel 18 surrounds cam feature 504. Accordingly, with additional reference to FIG. 5F, biasing member 26 may bias roller 32 towards stopper 20. In various embodiments, the bias of biasing member 26 may be large enough to drive follower towards stopper 20, causing follower 16 to rotate about second pin 30, but not great enough to impede the rotation of hook 12.

Figure 5F:
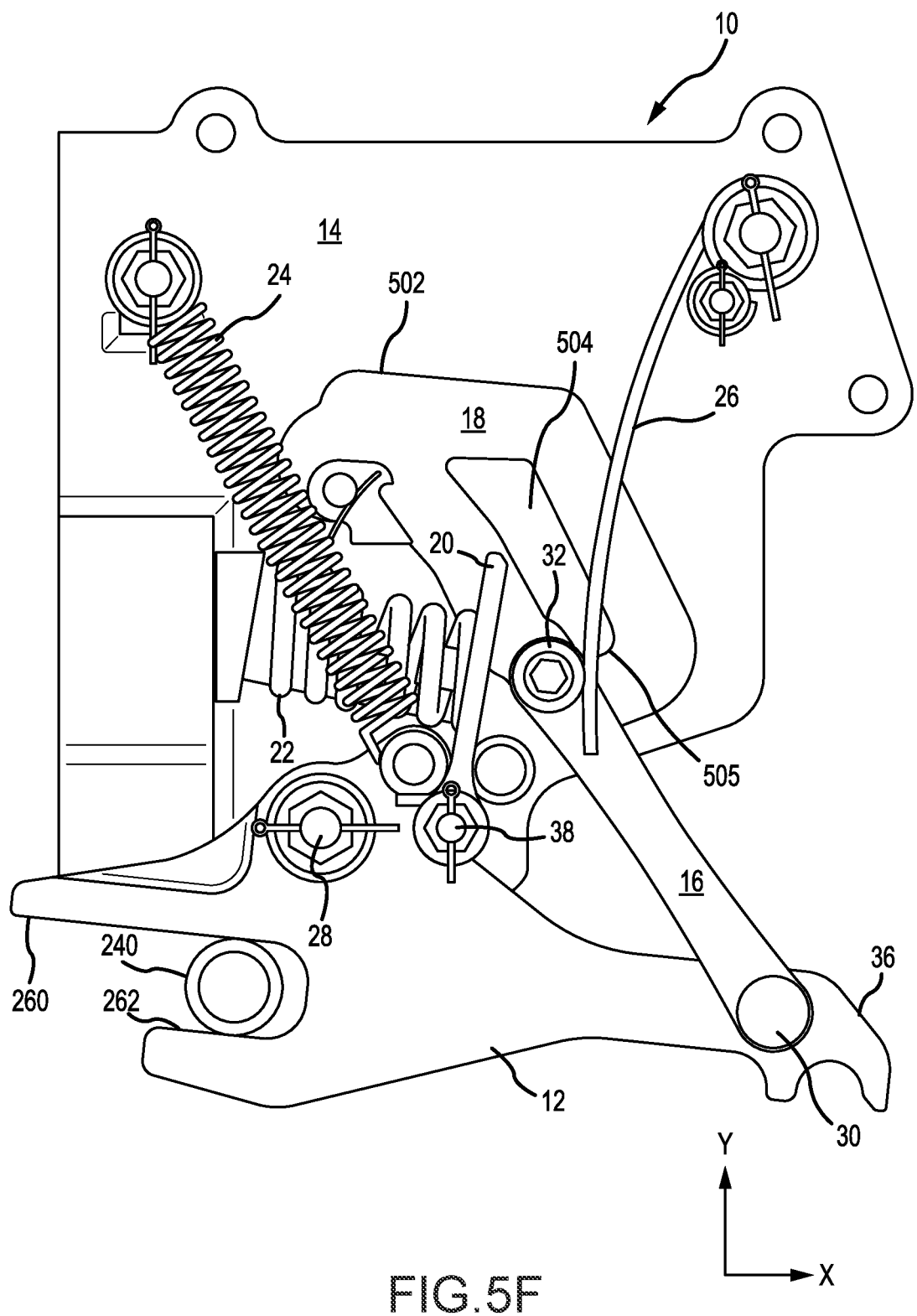
FIG. 5F illustrates a locking process of a landing gear uplock system, in accordance with various embodiments.
Figure 5G:
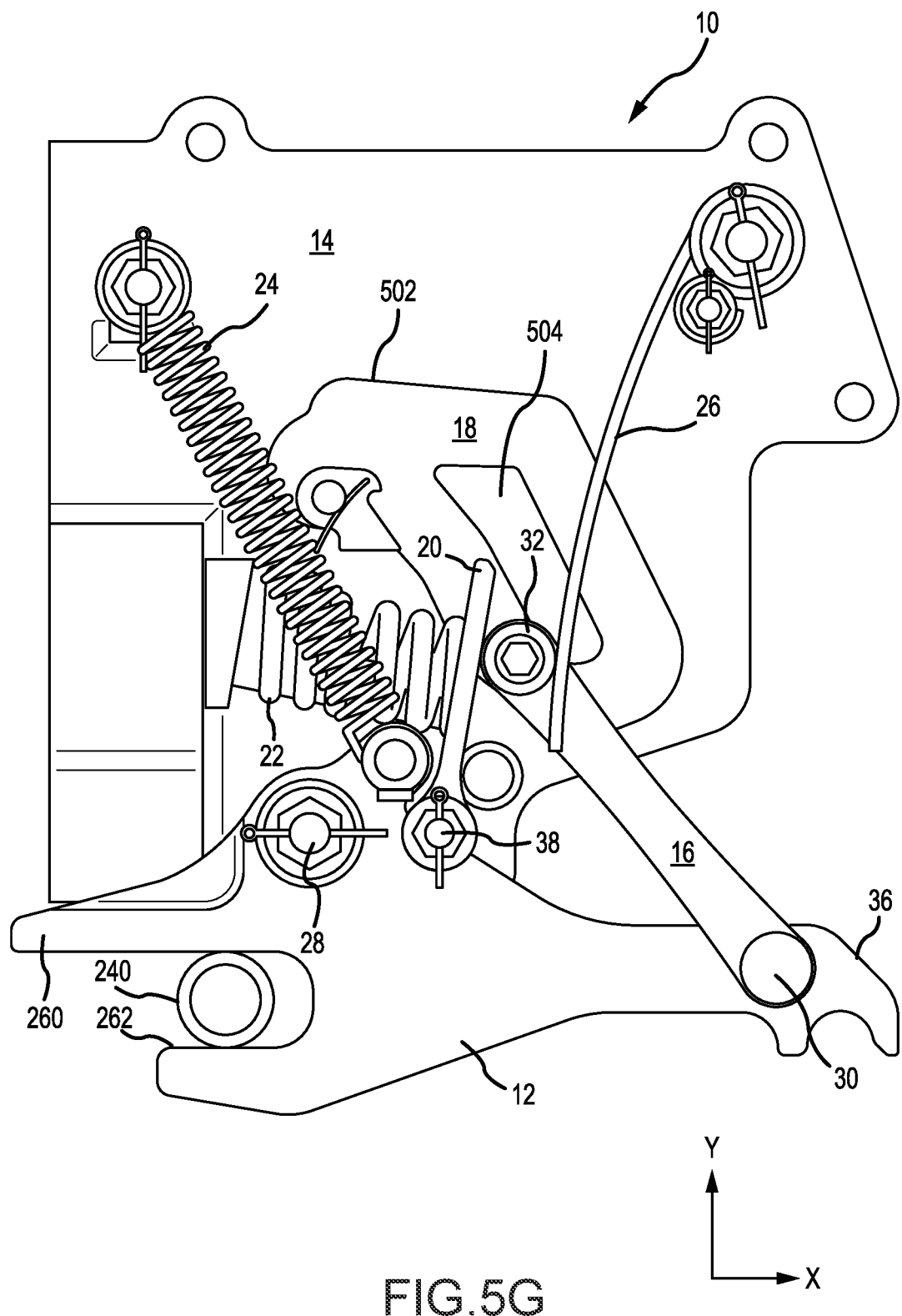
FIG. 5G illustrates a locking process of a landing gear uplock system, with the landing gear uplock system in a locked position, in accordance with various embodiments.

With further reference to FIG. 5F, as landing gear roller 240 continues to engage hook 12 (moving in the positive y-direction), hook 12 may continue to rotate about first pin 28 in the clockwise direction. With momentary reference to FIG. 2A, in response to piston 245 completing its retraction stroke, hook 12 may complete its maximum rotation in the clockwise direction (i.e., maximum movement of roller 240 in the hook opening 34 in the positive X-direction) with roller 240 in contact with first surface 260 of hook 12. Roller 32 may follow the outer surface of cam feature 504 in the negative x-direction until roller 32 is no longer in contact with cam feature 504, at which point biasing member 26 may bias follower 16 to begin to rotate about second pin 30 in the counter-clockwise direction as viewed in FIG. 5F. Follower 16 may continue to rotate about second pin 30 with roller 32 traveling along cam channel 18 under the urging of biasing member 26 (see step 435 in FIG. 4). In this regard, step 435 may comprise changing, by roller 32 from traveling in a first direction (e.g., to the right in FIG. 5F) to a second direction (e.g., to the left in FIG. 5F) under the urging of biasing member 26 and in response to roller 32 reaching a terminal point 505 of cam feature 504. Furthermore, step 435 may comprise changing, by roller 32 from traveling in a third direction (e.g., down in FIG. 5F) to a fourth direction (e.g., up in FIG. 5F) and in response to roller 32 clearing terminal point 505 of cam feature 504. Follower 16 may continue to rotate about second pin 30 with roller 32 traveling along cam channel 18 under the urging of biasing member 26. With the roller 32 in this position, retract actuator may be switched off (e.g., in response to a hydraulic valve being moved to a neutral position), allowing retract actuator piston 245 (see FIG. 2A) to take to idle stroke under the influence of the self-weight (due to the force of gravity acting downward (i.e., the negative Y-direction) of landing gear 200. Rotation of landing gear 200 (in the clockwise direction in FIG. 2A) allows landing gear roller 240 to contact second surface 262 of hook 12 to drive hook 12 in the counter clockwise direction. Hook 12 may rotate in the counter clockwise direction and drive roller 32 in the upward direction (i.e., positive Y-direction) along cam channel 18. Simultaneously, third biasing member 26 may drive roller 32 towards the left direction (negative X-direction) until roller 32 strikes (or is stopped by) stopper 20 as illustrated in FIG. 5G (see step 440 in FIG. 4). At this time, with reference to FIG. 5G, landing gear roller 240 may be locked within hook 12. Landing gear roller 240 may contact surface 262 of hook 12. However, biasing member 22 may urge stopper 20 in the first rotational direction, extending into the path of roller 32 along cam channel 18, thereby blocking rotation of hook 12 and securing the landing gear roller 240 (see step 450 in FIG. 4). In response to landing gear roller 240 contacting surface 262, roller 32 may contact stopper 20 and/or cam feature 504. In various embodiments, roller 32 may be wedged between stopper 20 and/or cam feature 504. FIG. 5G illustrates uplock system 10 in a locked position (also referred to herein as a second stable position), in accordance with various embodiments. In various embodiments, in the locked position, the roller 32 may be in contact with the stopper 20, the cam feature 504, and the third biasing member 26. Landing gear roller 240 may be retained, or prevented from moving in the negative y-direction, by the second surface 262 of hook 12 when hook 12 is in the locked position.

Figure 5H:
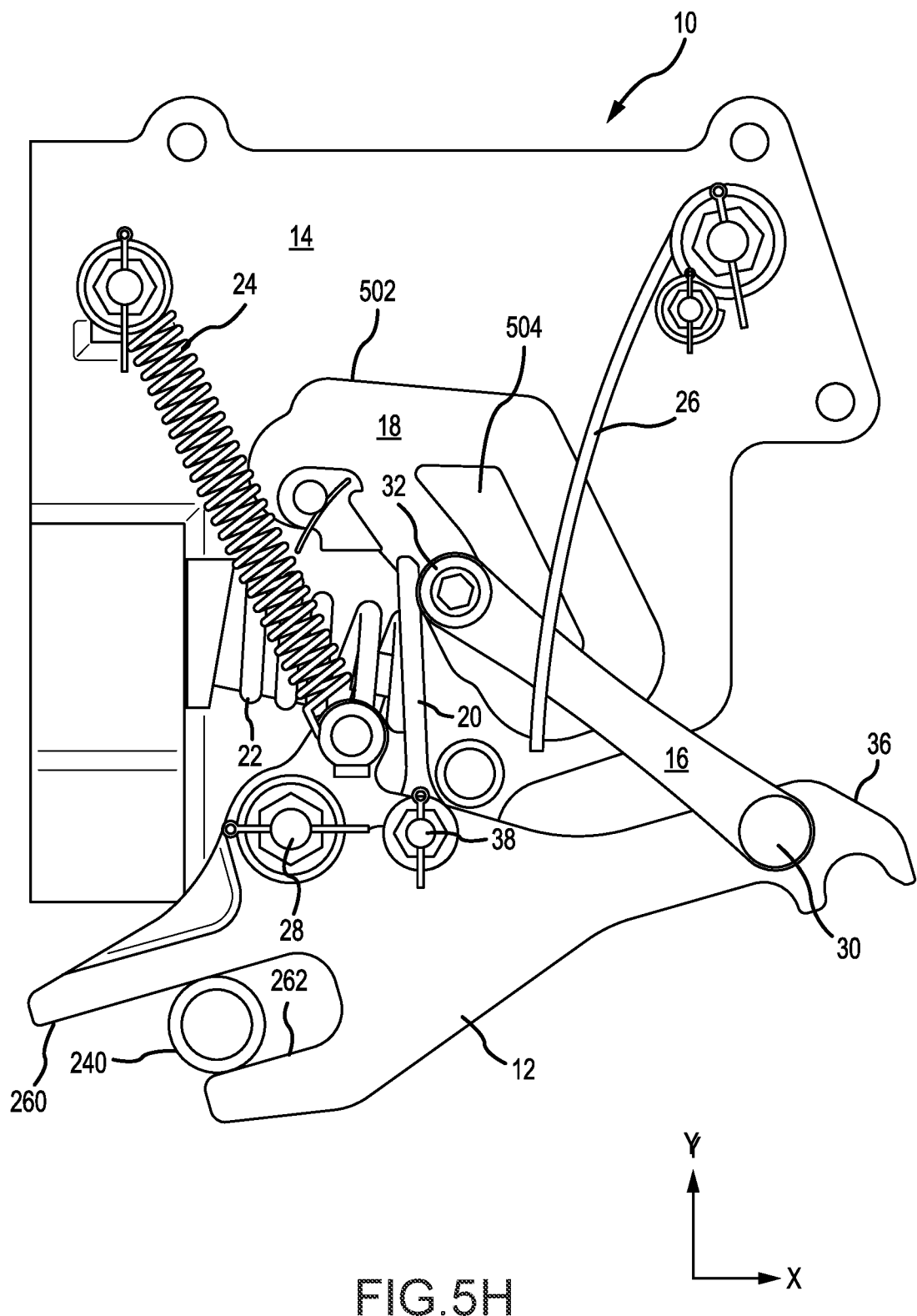
FIG. 5H illustrates an unlocking process of a landing gear uplock system, in accordance with various embodiments.

With further reference to FIG. 5H, to begin the unlocking process of uplock system 10, landing gear roller 240 may move in the negative y-direction which may cause hook 12 to rotate about first pin 28 in the counter-clockwise direction. Landing gear roller 240 may move in the negative y-direction in response to extension of actuator 244 (see FIG. 2B). As explained with reference to FIG. 2A and FIG. 2B, while biasing member 22 prevents undesirable deployment of landing gear 200, actuation of actuator 244 may drive hook 12 to rotate and overcome the bias of biasing member 22. The rotation of hook 12 about first pin 28 in the counter-clockwise direction may drive follower 16 generally in the positive y-direction causing roller 32 to engage or otherwise interact with stopper 20 (see step 350 of FIG. 3). Furthermore, the rotation of hook 12 about pin 28 may cause follower 16 to push against stopper 20, thereby exerting a landing gear deployment force into biasing member 22.

Figure 5I:
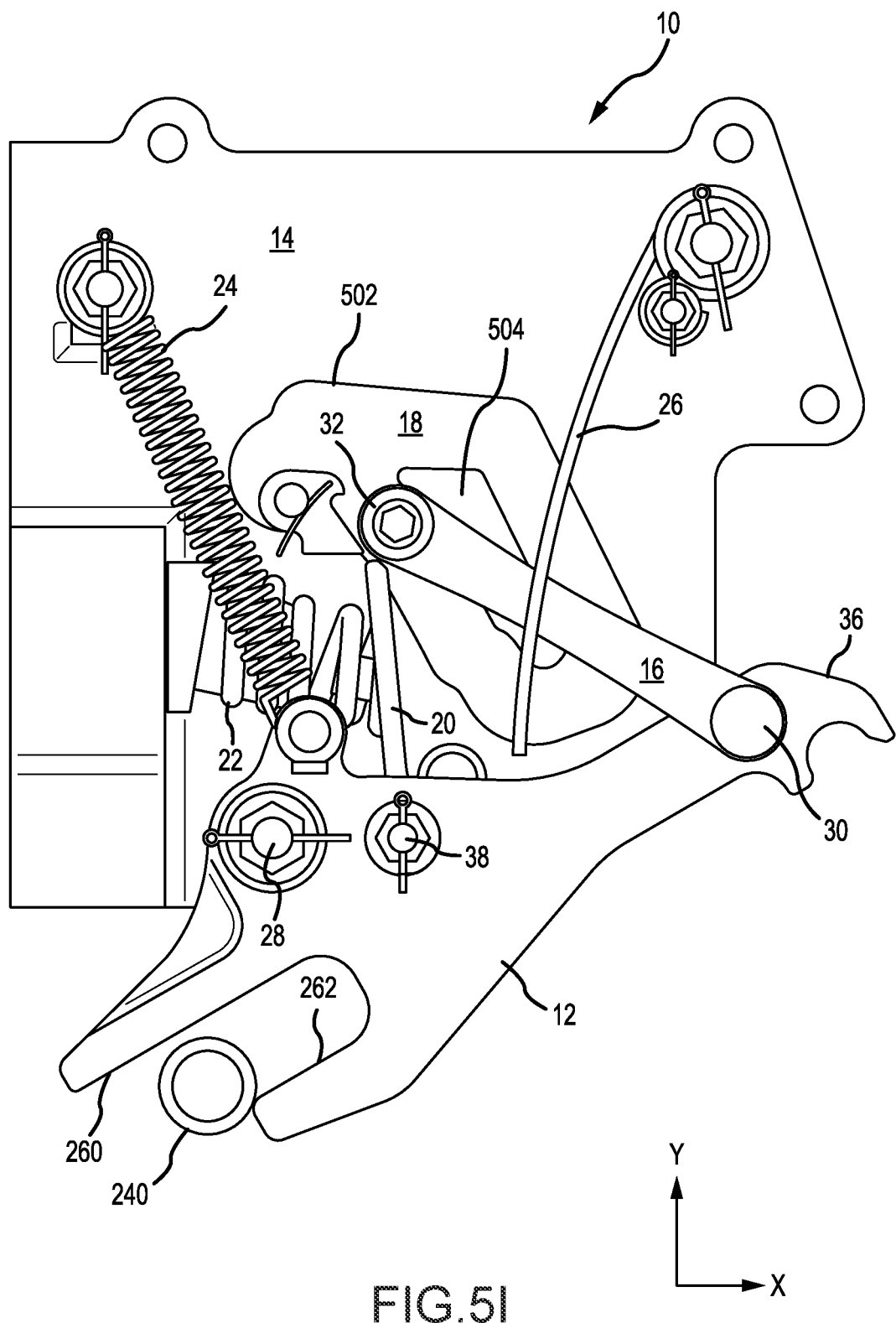
FIG. 5I illustrates an unlocking process of a landing gear uplock system, in accordance with various embodiments.
Figure 5J:
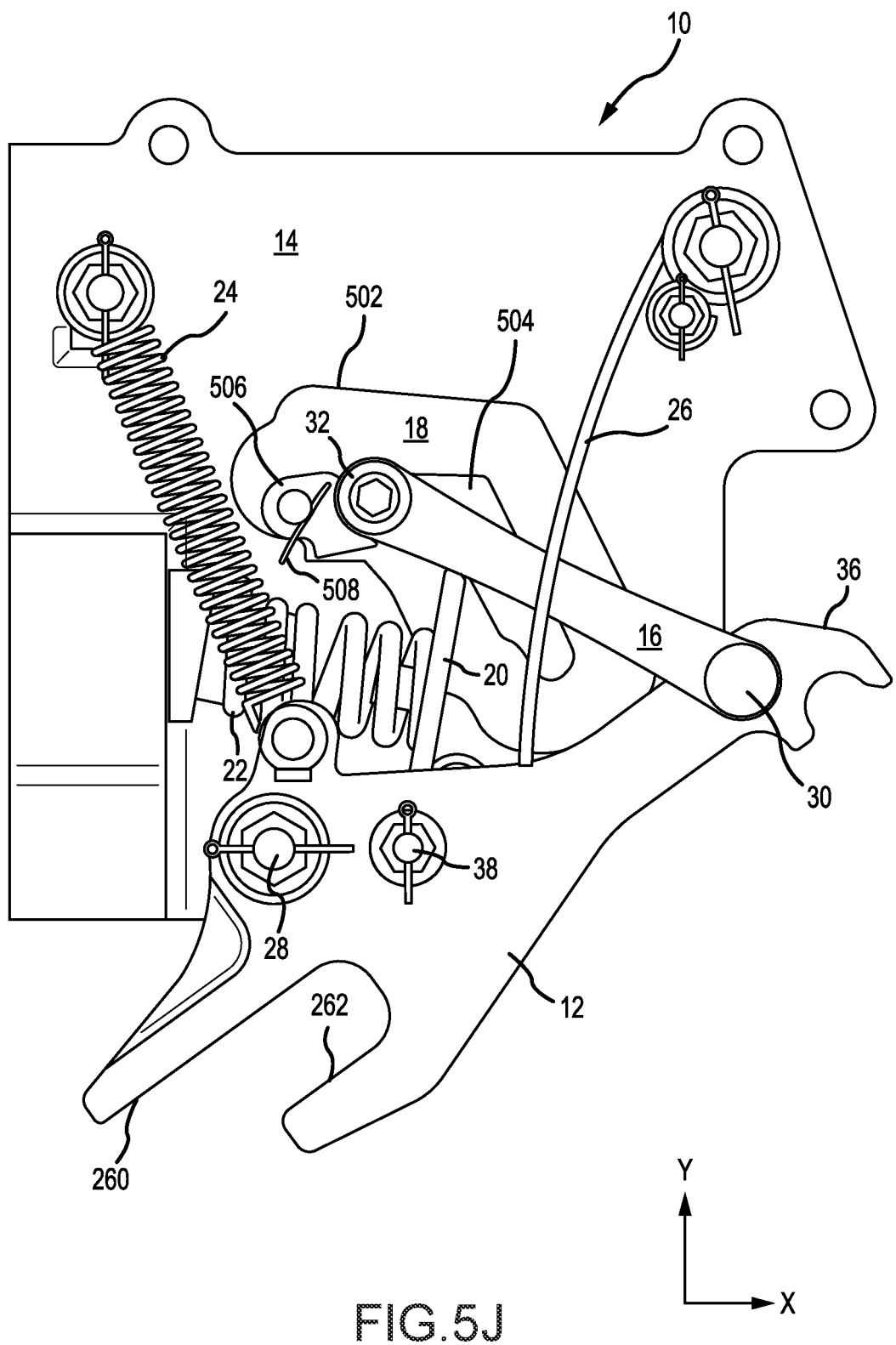
FIG. 5J illustrates an unlocking process of a landing gear uplock system, in accordance with various embodiments.
Figure 5K:
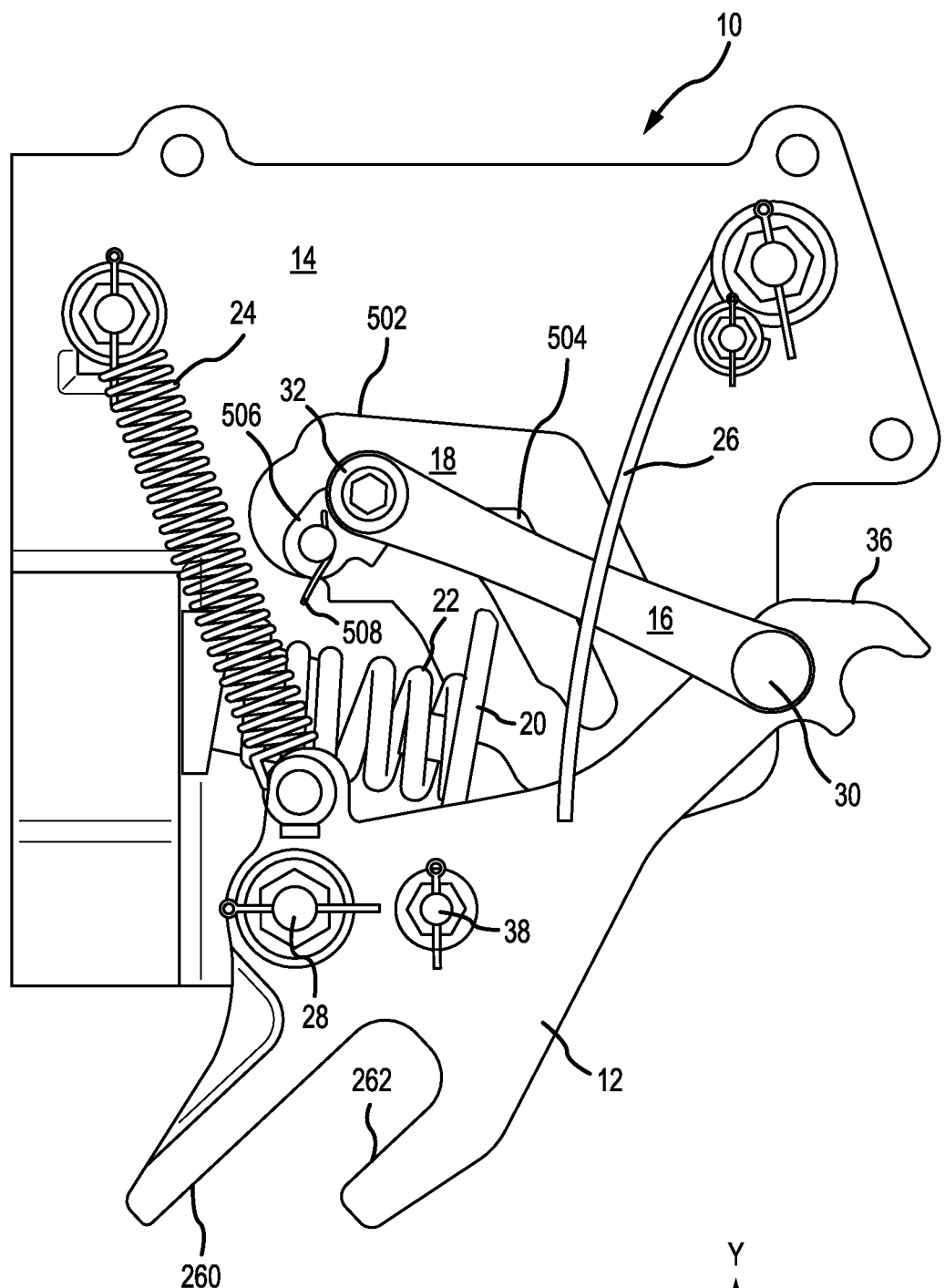
FIG. 5K illustrates an unlocking process of a landing gear uplock system, in accordance with various embodiments.

With additional reference to FIG. 5I, in response to the landing gear deployment force overcoming the spring force of biasing member 22, stopper 20 may rotate away from cam channel 18 to allow follower to move along cam channel 18. In response to overcoming the bias of biasing member 22, stopper 20 may be rotated out of the way of follower 16 and follower 16 may move along cam channel 18 as hook 12 rotates about pin 28 (see step 340 and step 360 of FIG. 3). With momentary reference to FIG. 5J, as hook 12 rotates in the counter-clockwise direction, the roller 32 may move past stopper 20, in response to which biasing member 22 may urge stopper 20 to rotate in the first rotational direction to return the stopper 20 to its original stopping position by contacting rest pad 48 (see FIG. 5E). Rest pad 48 may be fixed with respect to cam plate 14. Roller 32 may contact a non-return stopper 506. Non-return stopper 506 may be rotatably coupled to cam plate 14. A fourth biasing member 508 may be configured to bias the non-return stopper 506 in the first rotational direction (i.e., clockwise direction as viewed in FIG. 5J). In various embodiments, fourth biasing member 508 comprises a torsion spring. The non-return stopper 506 may be configured to rotate in the second rotation direction (i.e., counter-clockwise direction as viewed in FIG. 5J) in response to roller 32 contacting non-return stopper 506. With additional reference to FIG. 5K, non-return stopper 506 continues to rotate against the bias of torsion spring 508 with roller 32 until the roller 32 clears the non-return stopper 506 and hook 12 returns to its unlocked or first stable position as illustrated in FIG. 5A. After clearing non-return stopper 506, non-return stopper 506 rotates back to its original position, as illustrated in FIG. 5I, to prevent roller 32 from travelling counter-clockwise along cam channel 18. As hook 12 rotates in the counter-clockwise direction, returning to its unlocked position, the landing gear roller 240 may be released from hook 12 to allow the landing gear 200 to fully deploy.

In various embodiments, cam channel 18 and/or cam feature 504 are integral, or monolithic, with cam plate 14. Accordingly, cam plate 14 cam feature 504 may comprise a single piece. In various embodiments, cam channel 18 is formed into cam plate 14 using subtractive manufacturing methods. In various embodiments, cam plate 14 may be manufactured via any suitable method.

Figure 6A:
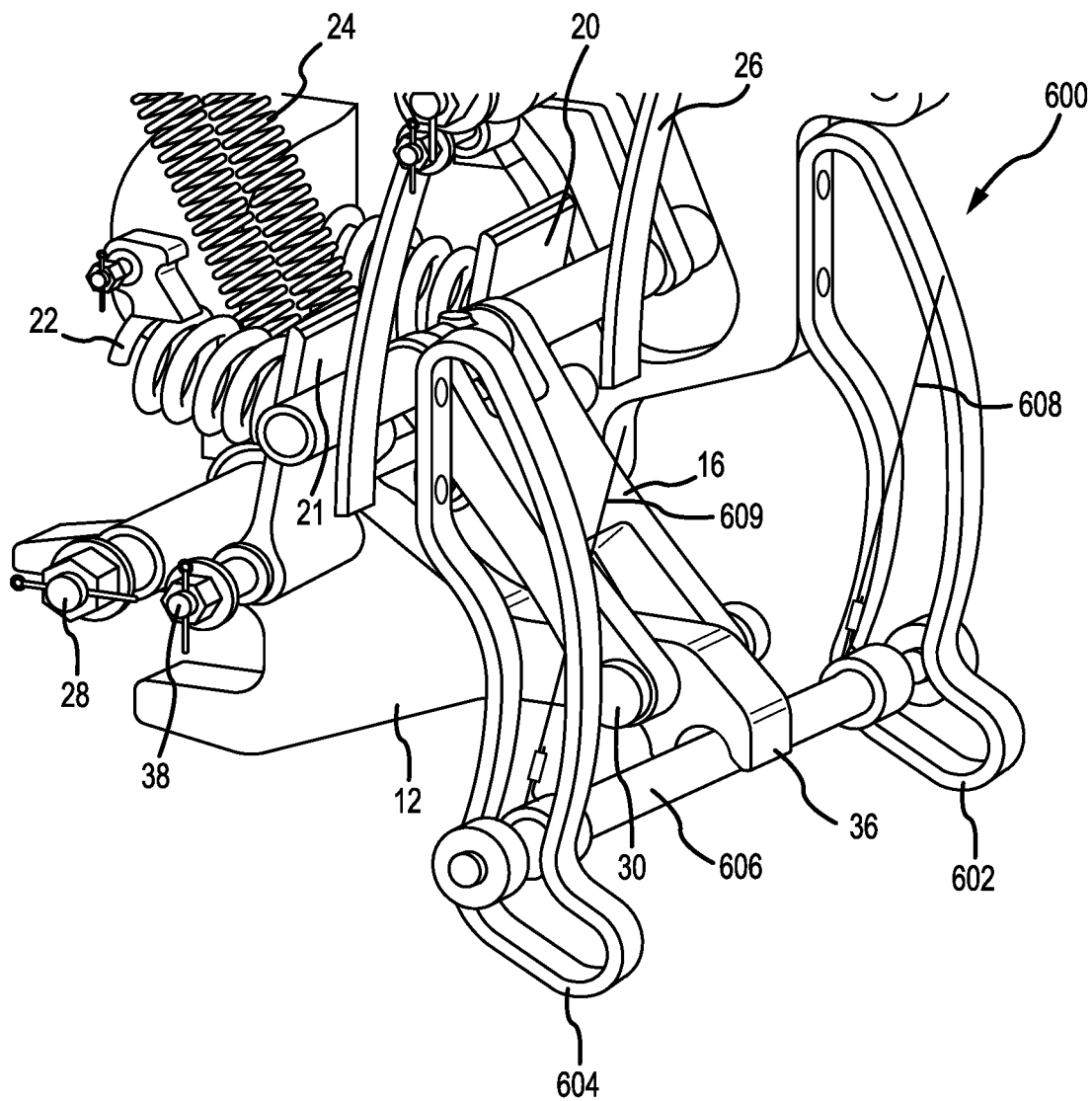
FIG. 6A illustrates a perspective view of a manual release system coupled to an uplock system, in accordance with various embodiments.
Figure 6B:
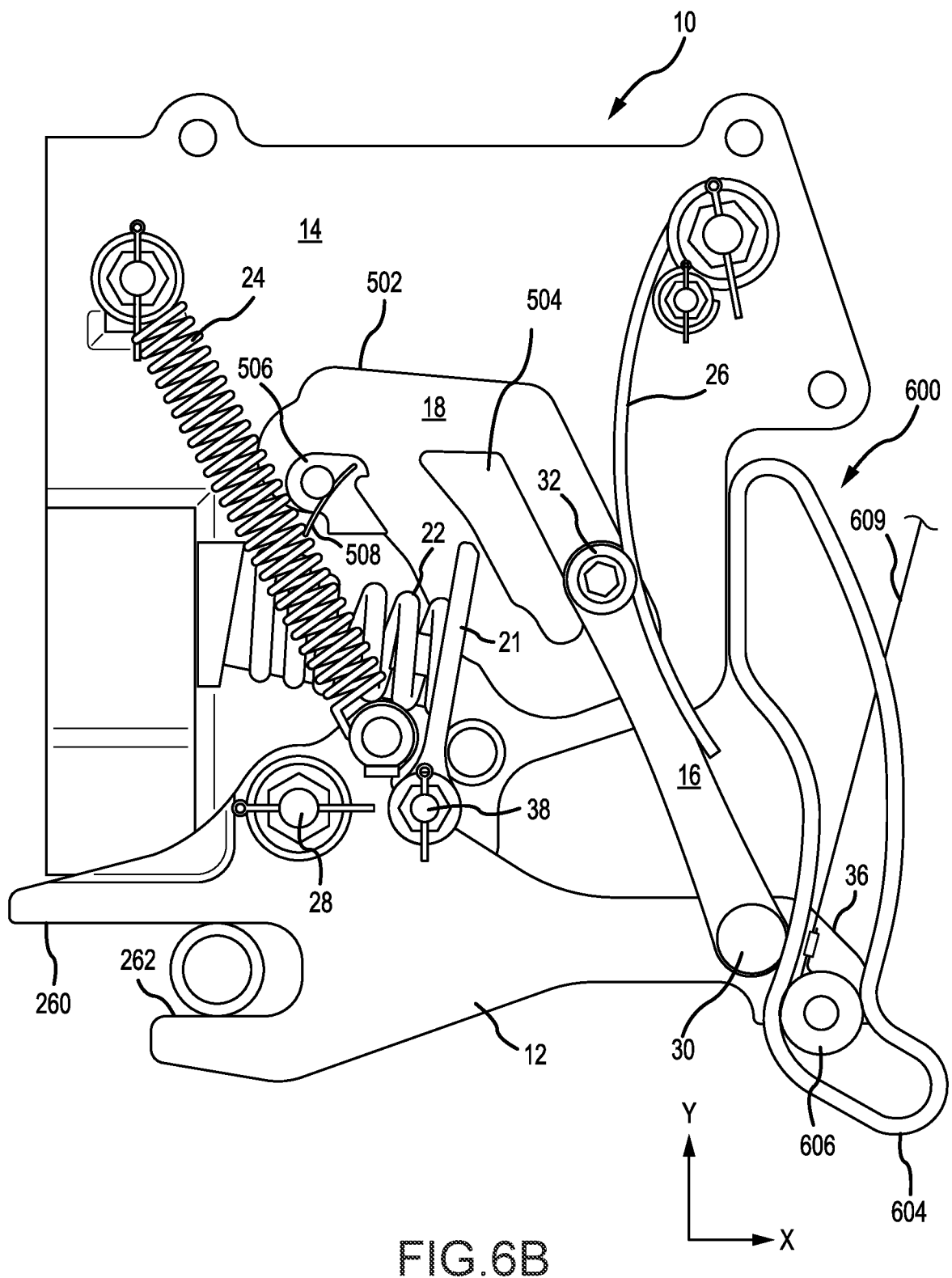
FIG. 6B illustrates a side view of the manual release system coupled to the uplock system of FIG. 6A, in accordance with various embodiments.

With reference to FIG. 6A and FIG. 6B, a manual release system 600 may be coupled to uplock system 10, in accordance with various embodiments. In various embodiments, manual release system 600 may comprise one or more emergency guides, such as emergency guide 602 and/or emergency guide 604. Emergency guide 602 may be attached to cam plate 14. Emergency guide 604 may be attached to cam plate 15. Manual release system 600 may further comprise an emergency pin 606 extending between emergency guide 602 and emergency guide 604. For example, a first end of emergency pin 606 may be supported by emergency guide 602 and a second end of emergency pin 606 may be supported by emergency guide 604. A middle portion of pin 606 may be configured to engage hook 12. A middle portion of pin 606 may be configured to engage or contact hook arm 36 of hook 12. However, middle portion of pin 606 may be configured to engage any suitable portion of hook 12, e.g., to maximize the mechanical advantage for rotating hook 12 about pin 28. Manual release system 600 may further comprise one or more cables, such as cable 608 and cable 609. Cable 608 and cable 609 may be coupled to emergency pin 606. In an emergency, such as when a landing gear deployment component is disabled for example, tension may be applied to cables 608, 609 to rotate hook 12 to an unlocked position to release a landing gear roller. As tension is applied to the cables 608, 609, pin 606 may move within emergency guides 602, 604 and cause hook 12 to rotate to the unlocked position. For example, cables 608, 609 may be routed to a cockpit of an aircraft for manual actuation of manual release system 600. In various embodiments, manual release system 600 may reset itself in response to the landing gear 200 being released from hook 12 and a pilot releasing tension on cables 608, 609 (e.g., via a handle). For example, tension on cables 608, 609 may be released by a pilot and the force of gravity may aid in returning pin 606 to its original position. In this regard, pin 606 may achieve its initial position (settle at the bottom of guides 602, 604), ready for the next operation cycle.

In various embodiments, each component of uplock system 10 may comprise any metallic material such as, for example, aluminum, steel, spring steel, titanium, aluminum alloy, steel alloy (e.g., stainless steel alloys), and/or titanium alloy.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An uplock system, comprising:
   a cam plate comprising a cam feature and a cam channel surrounding the cam feature;
   a hook having an opening, the hook configured to rotate with respect to the cam plate;
   a stopper configured to rotate with respect to the cam plate;
   a first biasing member configured to bias the stopper in a first rotational direction relative to the cam plate; and
   a follower rotatably coupled to the hook, wherein a portion of the follower moves within the cam channel;
   wherein the first biasing member is configured to bias the stopper in the first rotational direction to stop the portion of the follower from moving along the cam channel and secure the hook in a locked position.

2. The uplock system of claim 1, wherein the portion of the follower is configured to push against the stopper to rotate the stopper in a second rotational direction, against the bias of the first biasing member, in response to the hook rotating with respect to the cam plate.

3. The uplock system of claim 2, wherein the portion of the follower is configured to push against the stopper to rotate the stopper in the second rotational direction, against the bias of the first biasing member, in response to the hook rotating in the second rotational direction with respect to the cam plate, to an unlocked position.

4. The uplock system of claim 1, further comprising a second biasing member configured to bias the hook in a second rotational direction.

5. The uplock system of claim 1, further comprising a second biasing member configured to bias the follower towards the stopper.

6. The uplock system of claim 1, wherein the portion of the follower comprises a roller.

7. The uplock system of claim 1, wherein the follower is coupled to the hook at a location opposite the hook from the opening.

8. The uplock system of claim 1, further comprising:
   a non-return stopper rotatably coupled to the cam plate, the non-return stopper configured to rotate with respect to the cam plate in response to contacting the follower; and
   a fourth biasing member operably coupled to the non-return stopper.

9. The uplock system of claim 1, wherein the first biasing member comprises a compression spring.

10. The uplock system of claim 4, wherein the second biasing member comprises a tension spring.

11. The uplock system of claim 5, wherein the third biasing member comprises a leaf spring.

12. The uplock system of claim 6, wherein, in the locked position, the roller is in contact with the stopper, the cam feature, and a third biasing member.

13. The uplock system of claim 1, further comprising a manual release system, the manual release system including a cable coupled to the hook, wherein the cable is configured to rotate the hook in a second rotational direction to begin an unlocking process, and the manual release system is configured to return to an initial position in response to tension on the cable being released.

14. An uplock system comprising:
    a cam plate comprising a cam feature and a cam channel surrounding the cam feature;
    a hook configured to rotate with respect to the cam plate;
    a follower rotatably coupled to the hook, wherein a portion of the follower moves within the cam channel in response to rotation of the hook;
    a stopper configured to engage the follower; and
    a first biasing member configured to bias the stopper towards the follower to stop the follower from moving within the cam channel, thereby locking the hook in a locked position.

15. The uplock system of claim 14, wherein the stopper is pivotally coupled to the cam plate.

16. The uplock system of claim 14, further comprising:
    a non-return stopper rotatably coupled to the cam plate; and
    a torsion spring configured to bias the non-return stopper in a first rotational direction,
    wherein the non-return stopper is configured to rotate in response to the follower contacting the non-return stopper.

17. The uplock system of claim 14, wherein the hook comprises a hook opening, the hook opening configured to receive a landing gear roller.

18. A method of operating an uplock system comprising:
    rotating a landing gear towards a deployed position, wherein the landing gear comprises a latchable member;
    contacting, by the latchable member, a hook, wherein the hook is configured to rotate with respect to a cam plate;
    rotating the hook in a second rotational direction in response to the contacting;
    moving a follower along a cam channel in response to the rotating of the hook, wherein the cam channel is disposed in the cam plate, the cam channel surrounds a cam feature, and the follower is rotatably coupled to the hook;
    contacting, by the follower, a stopper, wherein a load is transmitted from the follower into a first biasing member in response to the follower contacting the stopper; and
    moving the stopper away from the follower, in response to the load overcoming a spring force of the first biasing member.

19. The method of claim 18, wherein the hook is configured to release the latchable member in response to the hook rotating in the second rotational direction.

\* \* \* \* \*